Figure 2:
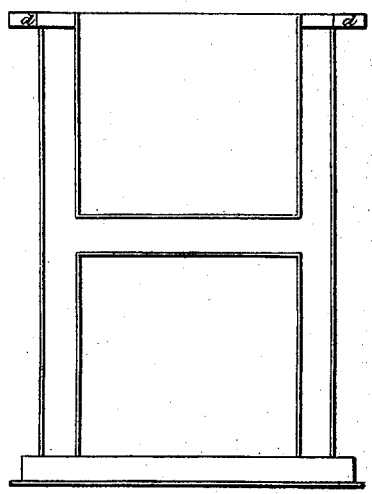

T. J. CHUBB.

Improvement in Ore-Separators.

No. 130,478.

7 Sheets--Sheet 1

Patented Aug. 13, 1872.

Witnesses.

Inventor.

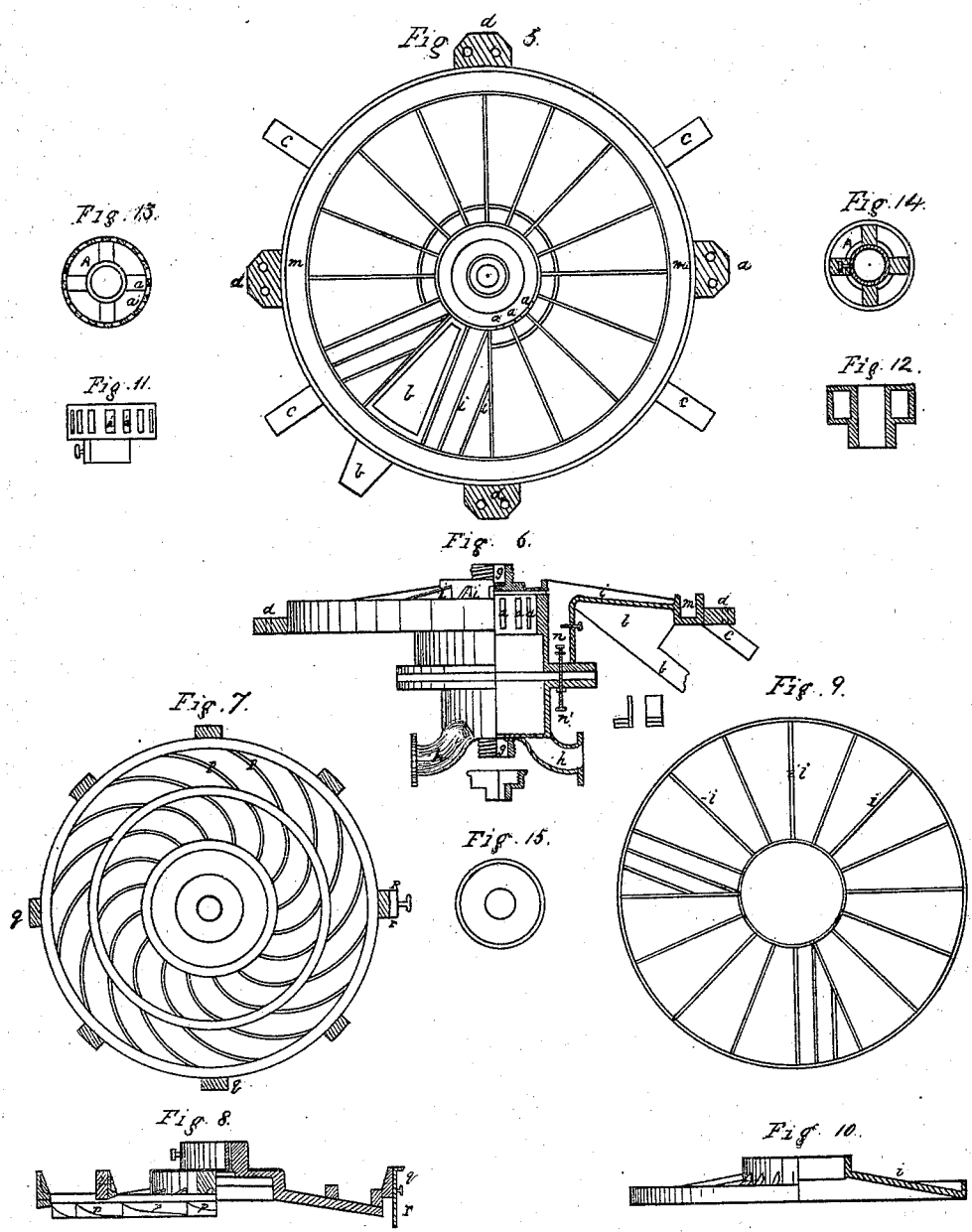

7 Sheets--Sheet 3.

T. J. CHUBB.

Improvement in Ore-Separators.

No. 130,478.   Patented Aug. 13, 1872.

Witnesses.   Inventor.

T. J. CHUBB.
Improvement in Ore-Separators.
No. 130,478.  Patented Aug. 13, 1872.
7 Sheets--Sheet 4.
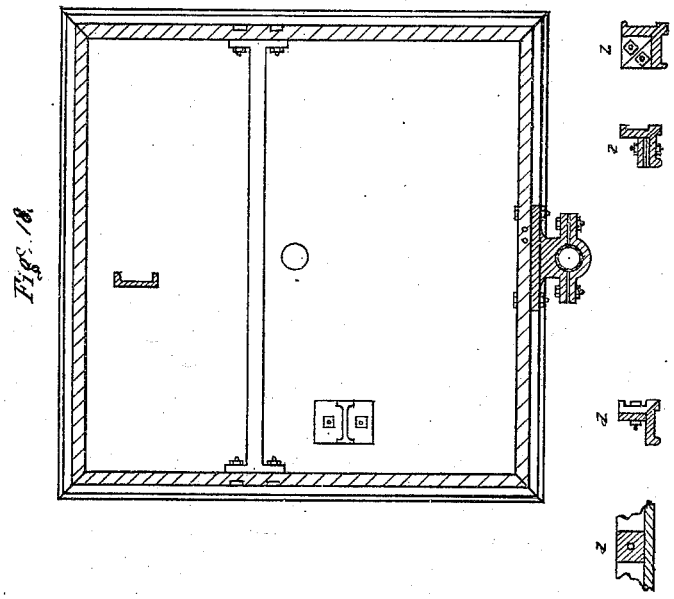
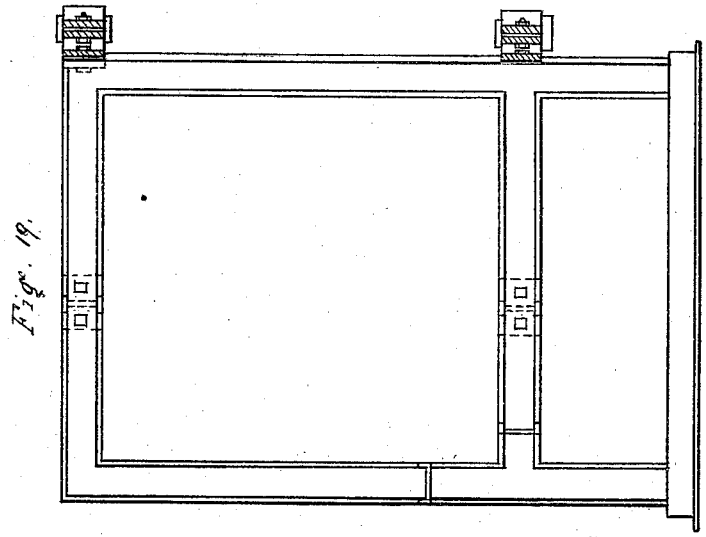
Witnesses  Inventor, T. J. CHUBB.
Improvement in Ore-Separators.
No. 130,478.  Patented Aug. 13, 1872.
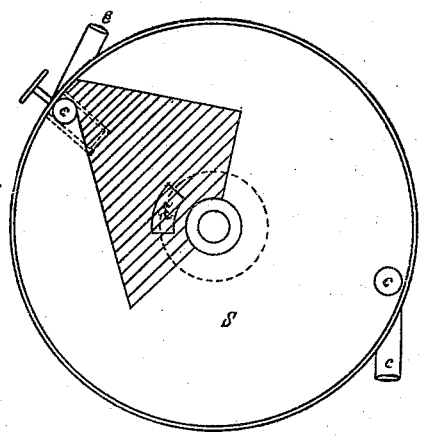
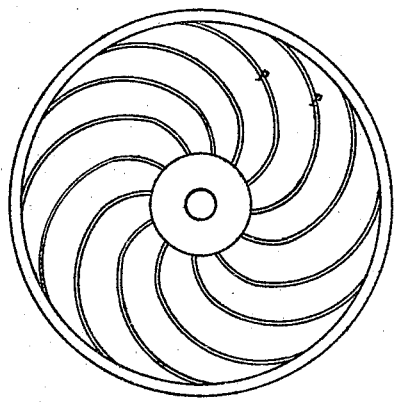
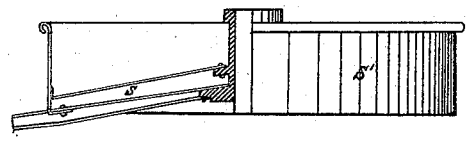
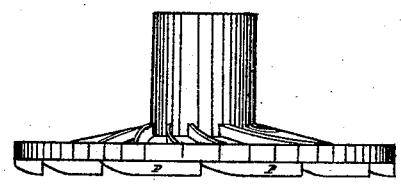
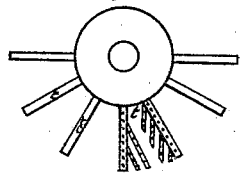
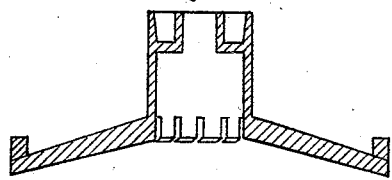
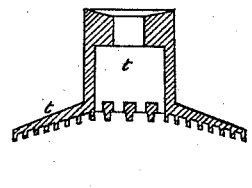
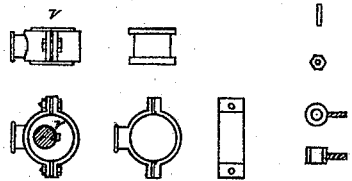
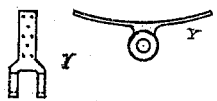
Witnesses  Inventor

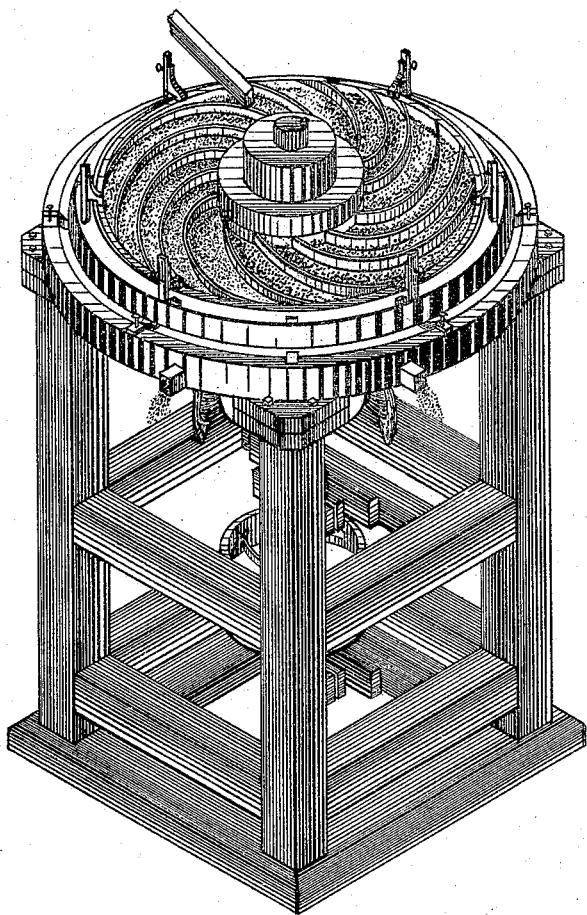

7 Sheets--Sheet 7.
T. J. CHUBB.
Improvement in Ore-Separators.
No. 130,478. Patented Aug. 13, 1872.
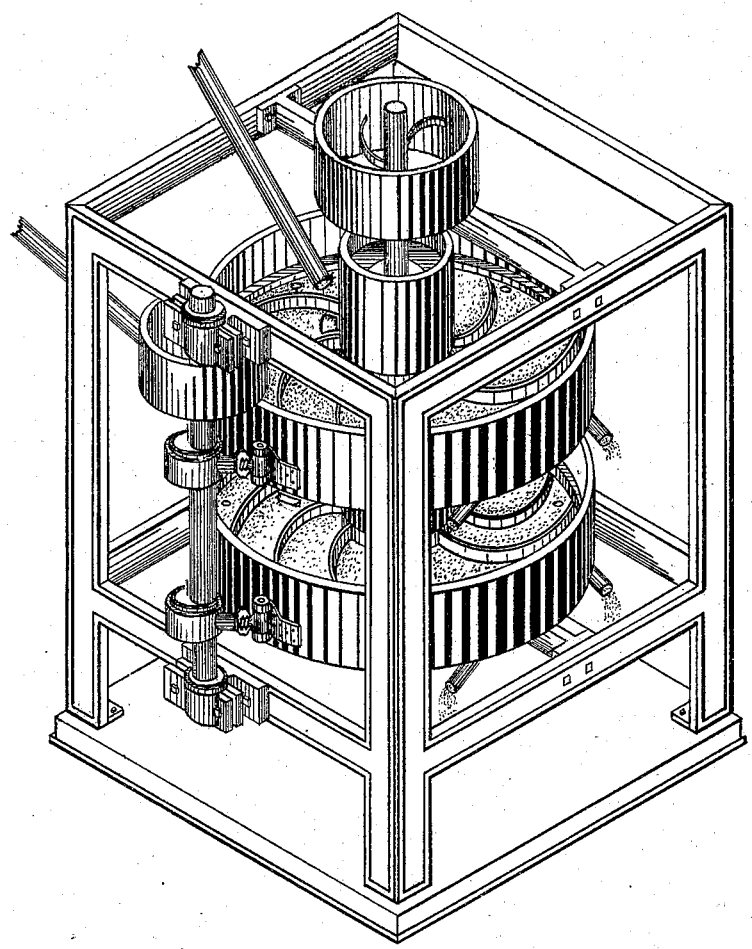
Witnesses,
Inventor,

UNITED STATES PATENT OFFICE.

THOMAS J. CHUBB, OF WILLIAMSBURG, NEW YORK.

IMPROVEMENT IN ORE-SEPARATORS.

Specification forming part of Letters Patent No. 130,478, dated August 13, 1872.

SPECIFICATION.

*To all whom it may concern:*

Be it known that I, THOMAS J. CHUBB, of Williamsburg, Kings county, in the State of New York, have invented new and useful Improvements in Process of Separating Ores and other substances of different specific gravity; and I do hereby declare that the following is a full, clear, and exact description thereof.

The first part of my invention relates to an improvement in the sizing and preparing of the ore previous to its being put into the ore-separating machines, without the use of bolting or sieve cloth. The second part of my invention relates to an improvement in the method of producing the puffs or peculiar intermittent current or currents of air described in my patent No. 18,038, of August 25, 1857, converting a steady or irregular current of air into a regular intermittent current or puffs of air by means of a valve or valves placed in the air-passage or other convenient place between the air-blower (or other equivalent mechanical device for moving, compressing, or blowing the air) and the ore, or substances, or material being separated, producing a peculiar, sharp, sudden puff, lifting the ore above it suddenly and bodily, or without disintegration, or destroying the stratums or layers of substances of different specific gravity, formed into stratums by previous puffs, and then an intermission of the current of air for a period of time sufficient to allow the material to settle, the heaviest particles, or those of the greatest specific gravity, falling first or faster through the remaining or remainder of the current of air at the latter part of the puff than the light particles, which are held up longer by this remaining although diminished current until the air ceases, or nearly so, when the lightest particles come to a state of rest on top of the heavier particles in regular stratified layers, according to their respective specific gravity. The difference in the peculiarity of the puff produced by my improved process and the puffs produced by a bellows or diaphragm-plate or similar mechanical device, as has been heretofore practically used, is that my improved puff produces no rescinding back action or drawing back of the air at each downward stroke of the bellows, which has its objection, also, in drawing a portion of the lighter particles of the material down among the heavier particles, thus producing an imperfect separation of the substances. The third part of my invention relates to an improvement in the method of moving and removing the several stratified layers on and off the bed, or delivering them from the machine into separate receptacles, by which means three or more different kinds or qualities of the material are being delivered from the machine at one time or at one operation, involving, also, a principle of concentration and reconcentration repeatedly, until perfection is attained, before the material leaves the machine, by means of mechanically-moving scrapers operating in and upon the stratified layers or upon the top layer in such a manner as to scrape or move the said layers in several directions to separate places or parts of the machine, gravity moving the material in one direction while the moving scrapers are moving it in two or more directions—first, in opposite directions to the lateral motion given to it by gravity and agitation caused by the puffs of air, thus allowing continuous reconcentration; second, the removal of the several stratified layers to other parts of the machine, so as to allow each stratified layer to be again reconcentrated in a continuous manner until the lighter particles are again moved onward to another part of the machine for further reconcentration, and so on until they (the lighter particles) are moved to the place intended for the discharge of the very lightest, while the several other kinds are being discharged at intervals, according to their respective specific gravity, in a continuous manner from several places—the heaviest first, the next in specific gravity second, and the next third, and so on to the very lightest, thus separating and delivering the metallic or pure mineral substance into the first receptacle, and particles of mineral with small particles of the gangue-rock mechanically attached thereto in the second receptacle, and particles of rock with small portions of the mineral mechanically attached thereto into the third receptacle, and the refuse gangue-rock into the last receptacle; or several different kinds of metals or mineral substances can be separated and collected into separate receptacles at one time and at the one and the same operation, provided there are several kinds of metals or mineral substances in the ore, and crushed in such manner as to mechanically detach one from the other. The difference in the peculiarity of the motion and the method of employing the scrapers in my improved mode and in the old method is that the chain of scrapers in the old way only produced one motion to the material, (which was deemed defective and abandoned,) while my improved method moves the material in several directions at one and the same time, producing new and useful results, effecting a reconcentration of the material, equivalent to passing the material, or the several separated qualities of the material, a number of times through a machine constructed with only two discharges, or so as to deliver only two kinds or qualities at the one and the same time or the one operation. The fourth part of my invention relates to the treatment of that portion of the ore that has been ground into dust, or too fine to be operated on by the dry or air process—that portion that would blow away; that portion that would fall through the wire-cloth or perforated bed; that portion or kind of ore that contains a quantity of free gold or other metal, mineral, or metallic substance, regardless of the size; and that portion that would pass through the finest size or kind of bolting, screening, or sieve cloth; and consists in placing the ore mixed with water into a partially-rotating and reciprocating sheet-iron pan—say about thirty inches in diameter—with a conical-shaped bottom, inverted so as to form an inclined plane, inclining from the center downward (at an angle of about two inches to the foot) to the outer edge, with a rim on the outer edge four inches high, and an eight-inch long sleeve-hub in the center with flanged bearings, top, and bottom, resting on a set-screw collar, which is on a two-inch wrought-iron shaft passing loosely through the center of the hub, resting and revolving in proper bearings at the rate of about twenty revolutions per minute. The pan, being loose on the center shaft, is kept in motion, partially revolving and reciprocating about two inches of stroke at its outer edge, by means of an eccentric or cam arranged on a similar two-inch shaft, located just outside of the rim of the pan, and placed perpendicular, (and parallel with the shaft through the center of the pan,) with a very short eccentric rod connected to a pivot on the outer edge of the pan. This eccentric shaft revolves at the rate of about three hundred to four hundred revolutions per minute. The throw of the eccentric may be less than two inches for very fine ore. On the top flange of the hub is a bearing for another flange resting on it, which is attached to a segment of a circular plate —about half of a circle—fifteen inches in diameter, and made conical, the same shape as the inner bottom of the pan, and fitting down close to it—within one inch. The plate is full of holes or open spaces, the solid portion being studded with pins or teeth projecting downward to within one-quarter of an inch of the bottom of the pan. This semicircular plate or stirrer revolves and reciprocates half the throw of the pan and back, and is used to prevent the fine dust, clayey, or muddy substances from adhering together or clogging up. Above this reciprocating stirrer is a circle of scrapers, or strips of metal attached to a center hub, which is keyed fast to the center shaft. These scrapers or strips of metal are placed one to three inches apart, one-quarter inch thick and one inch high, and arranged at an angle of thirty to sixty degrees from a line across the center of the pan, curved tangent to each other so as to scrape or move the top layer of the material in the pan in two directions. As the scrapers revolve upon a common center the material is not only pushed along in the direction the scrapers are traveling, but it slides back on the tangent-curved face of the scrapers, and is thereby also pushed up the incline toward the center of the pan. Near the outer edge, in the bottom of the pan, several openings, about two inches in diameter, are arranged, provided with adjustable gates for the discharge of the several qualities of the heaviest concentrated substances, and an opening about two inches by three inches in the bottom, near the center of the pan, is provided for the discharge of the very lightest substances, and a stationary feed-pipe arranged just forward (in the direction the scrapers travel) of the large discharge-hole intended for the discharge of the lightest substances. The motion given to the pan by the eccentric or cam being irregular, or traveling faster one way than the other, or faster in the direction the scrapers travel, then the pan slips from under the material, and the material rides on the bottom of the pan during the slower return motion; consequently all the material in the pan below the scrapers is propelled backward or in a reverse direction to the direction in which the scrapers are traveling; and if the gates for discharging the concentrated matter be wholly or partially closed the concentrated and concentrating matter is continuously reconcentrated to any degree of purity required. The very heaviest particles or purest concentration will always be found near or discharged at the gate nearest the feed-pipe. Several different qualities of concentrated matter may be discharged at the several gates near the outer edge of the pan. Two or more pans may be adjusted, one above another, on the one center shaft, and larger machines may be used for coarse sands; and this machine may also be used without water and the ore dry, for sizing and preparing the ore for the final separation by specific gravity. When the machine is used dry the material is governed by the laws peculiar to agitation only, which causes the larger or coarser particles in reality to resist the reciprocating or shaking motion of the machine and stand still, or nearly so, while the smaller or finer particles receive the motion of the bottom or bed of the machine, and travel with it so as to apparently allow the larger or coarser particles to travel further over the bed of the machine by the shaking motion, and ride over and on top of the smaller ones or finer particles, regardless or nearly so of their specific gravity, and the scrapers carrying the top layer or coarser particles in one direction, while the peculiar irregular motion of the pan carries and causes the bottom layer or finer particles to travel in opposite direction, whereby a separation into sizes is effected, and the respective sizes are drawn off or discharged at the several gates near the outer edge, and the very coarsest at the center opening; but when water also is in the machine as a floating medium, then the material is subjected to the combined laws peculiar to both forces—specific gravity and agitation—and also to the several special motions given to the material by the peculiar action of the scrapers. This machine, when provided with a wire-cloth or perforated intermediate bottom between the sheet-iron bottom and the scrapers, on which the ore rests, and puffs of air applied up through the interstices of the wire-cloth, and the material resting thereon in place of water as a floating medium, then the machine may be considered as working by the dry process, and producing a separation and concentration of substances of different specific gravity far superior to any process heretofore known.

The peculiar and small details of the mechanical arrangements of the parts of the machines described herein, will be subjects for other applications for patents on such mechanical arrangements; but I do not confine my discoveries, inventions, and improvements to any special peculiar mecanical arrangements of the parts of the machine.

The drawing accompanying this specification represents a machine constructed for employing my improved process. The several figures show the machine employed dry and wet. The wet machine used without water effects the separation of the particles of the material into several sizes, previous to treating them for their separation by specific gravity.

Figure 1:
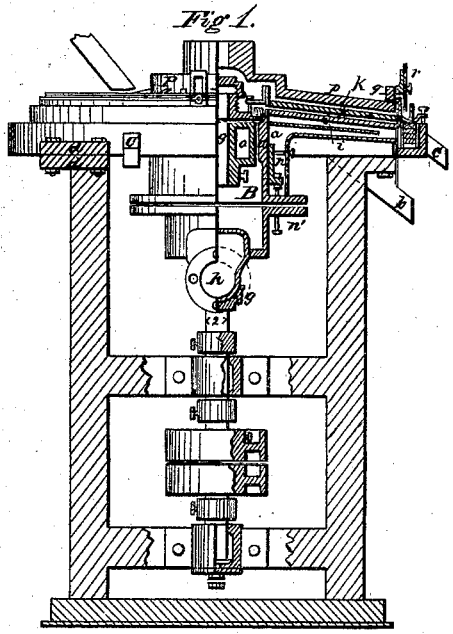
Figure 4:
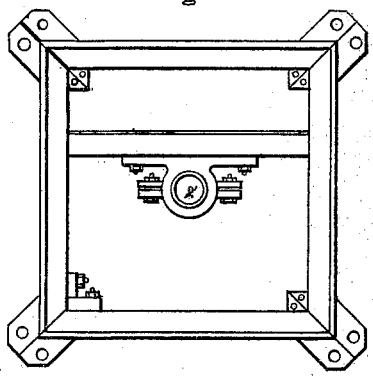
Figure 3:
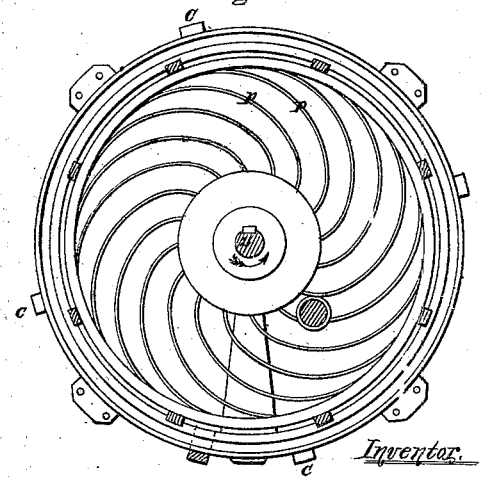
Figure 17:
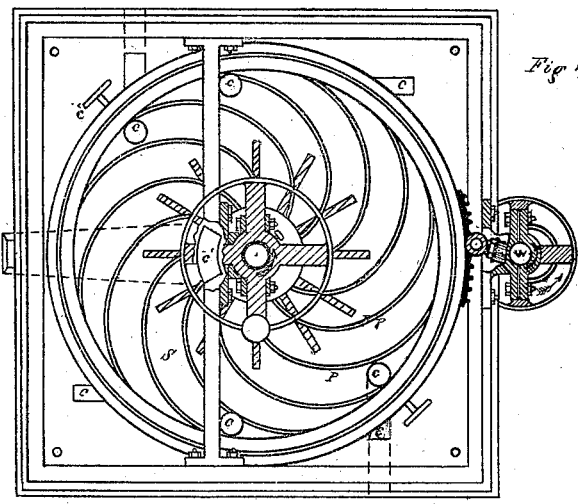
Figure 16:
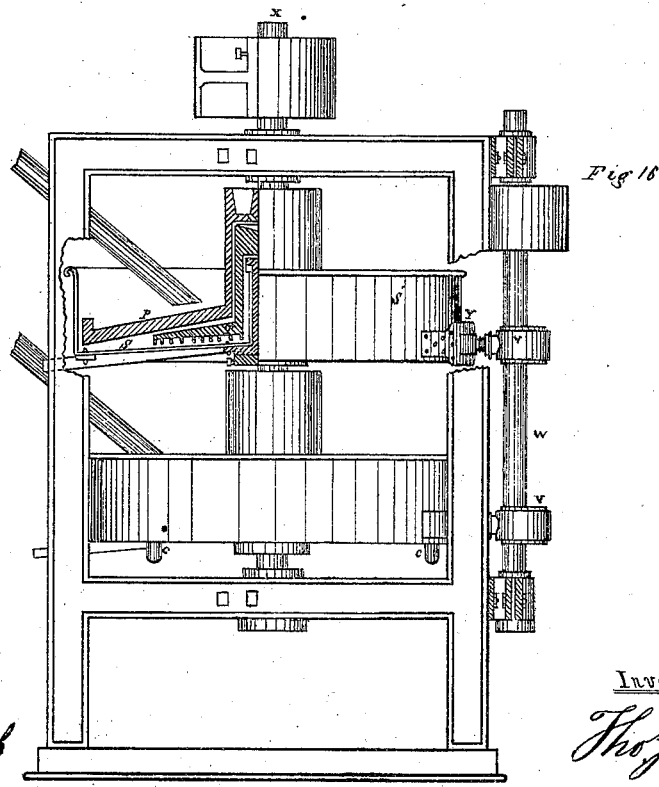

Figure 1 is an elevation of the dry separator. The left-hand-side half shows the outside view, and the right-hand-half shows a sectional view. Fig. 2 is an elevation of the frame for the same. Fig. 3 is a top view or plan of the same machine. Fig. 4 is a section of the top view or plan of the frame. Fig. 5 is a top view of the bed, and showing the air-chamber below the perforated bed, and some of the openings $a\ a\ a$ in the valve-seat, and the opening $b$ in the bed for the discharge of the lightest substances, and the several openings $c\ c\ c\ c$ for the discharge of the heavier substances in rotation, according to their respective specific gravities, and the lugs $d\ d\ d\ d$ for bolting the same to the frame. Fig. 6 is an elevation of the same bed, air-chamber, &c.; the left half shows the outside, and the right half shows a section, the valve-seat and openings $a\ a\ a$ therein, and the stuffing-boxes $g\ g$, and the air feed-pipe $h\ h$, and the strips of metal $i\ i\ i$, for supporting the wire-cloth or perforated bed, and the groove $m$ for receiving the heaviest concentrated substances, and the valve $n$ and the screw $n'$ for regulating the quantity of air passing out of each valve-seat opening into the sixteen separate chambers around the bed of the machine. Fig. 7 is a top view of the scrapers $p\ p\ p$, showing eight lugs $q\ q$ for holding adjustable scrapers $r\ r$ for scraping or moving the substances in the groove $m$ to the openings or discharge places $c\ c\ c$. Fig. 8 is an elevation of the same, showing one of the scrapers $r$ and the connection of the scrapers $p\ p$ to their hub. Fig. 9 is a set of strips of metal corresponding to strips $i\ i\ i$, and intended to be placed directly over them to hold down the wire-cloth or perforated bed $k$. Fig. 10 is an elevation of the same. Fig. 11 is the air-discharging valve for converting a steady blast or current of air into an intermittent current or puffs of air. Fig. 12 is an elevated section of the same. Fig. 13 is a top view or cross section of the same. Fig. 14 is a bottom view of the same. Fig. 15 is a top view of the same. Fig. 16 is an elevation of the wet-ore separator. The right-hand half shows the outside view, and the left-hand half shows a section of the same. $v$ is the inverted conical bottom. $t$ is the stirrer or semicircular disk. $p\ p$ are the scrapers for removing the top layer of material in a reverse direction to the movement given to the same by the peculiar motion of the bed $s$. $v$ is the cam or eccentric for producing the irregular or peculiar motion given to the bed $s$. $w$ is the eccentric shaft. $x$ is the center shaft, on which the scrapers are firmly attached, and the pan is loosely resting and partially revolving and reciprocating thereon. $s'$ is the rim of the pan on which the pivot $y$ of the eccentric-rod is attached. Fig. 17 is a top view of the wet machine. $c\ c\ c$ are the openings and the regulating gates for the discharge of the several qualities of the concentrated matter. Fig. 18 is a top view of the frame for the same. Fig. 19 is an elevation of the same frame. $z\ z\ z\ z$ are the several corner fastenings of the frame. Figures on Sheet 5 show the detailed parts of the wet separator or sizing and preparing machine, being the working drawing for all the parts of the same.

Two circular sets of scrapers may be employed, arranged one above the other, working in reverse or opposite directions in and through the several stratified layers of the material, thus moving them to separate parts of the machine.

In the dry separator the center shaft on which the valve for producing the puffs of air and the scrapers are made fast may revolve at a speed of say fifty to sixty-two and one-half revolutions per minute. There being sixteen ports in the valve and a corresponding number of openings in the valve seat, each revolution of the shaft gives sixteen discharges or puffs of the air, or eight hundred to one thousand puffs per minute, which valve operates without any hammering, jarring, or noise. The stationary feed-pipes will deliver the ore on the bed as fast as the scrapers remove it.

In the wet machine the shafts revolve in the direction of the arrows at a regular or even speed. The throw of the eccentric is nearly twice as fast in traveling in the direction the scrapers travel as it moves the pan in the opposite direction. This is caused by the shortness of the eccentric-rod and its direction, thus producing the peculiar irregular motion of the bed of the pan $s$ and the travel of the material therein around the pan in a reverse direction to the movement given to the top layer of the material by the scrapers.

What I claim is—

1. The process herein described for sizing and preparing the ore previous to separating or concentrating without the use of bolting or sieve-cloth, viz.: By the quick travel in one direction and the slow travel in the reverse direction given to the pan, and the travel of the curved scrapers thereon, whereby the top layer of the material is moved in one direction around the pan while the under layers are moved in a reverse direction, so that the several sizes of material may be drawn off at outlets arranged at intervals around the pan.

2. The method of producing the puffs or intermittent current of air by means of the sliding balanced valve or valves, arranged and operated in the air-passage near the perforated bed, whereby any jarring is obviated, substantially as described.

3. The method of moving the material around and up the incline of the pan at the same time by means of curved scrapers and a cone-shaped pan bottom, said bottom inclining from center to circumference, as and for the purposes set forth.

4. The mode of producing a movement of the material across the conical perforated bed from center to circumference by means of the incline of the bed or of the material thereon, and the agitation produced by the intermittent air-currents, substantially as described.

5. The method of moving the substance around over the perforated bed, and upward in a direction opposite or nearly opposite to that produced by the incline of the bed and the intermittent air-currents, at one and the same time, by means of curved scrapers and the cone-shaped bed, substantially as described.

6. The mode of discharging three or more sized or separated or concentrated ores at one and the same time by means of several discharge-orifices, arranged at different points of the bed, over which revolves a curved scraper, or a straight scraper arranged at a tangent, for the purpose set forth.

7. The mode herein described of separating the finer particles of the ore which would blow away and be lost by the dry process, and also the coarser particles containing free gold or too large to be worked by the dry process, viz.: By means of a pan having a quick travel in one direction and a slow travel in the reverse direction, combined with curved or tangential scrapers and a suitable water-feed or equivalent devices, substantially as set forth.

8. The balanced slide-valve or valves A, provided with ports $a\ a\ a$, arranged within the air-chamber and directly beneath the ore-bed, substantially as described.

9. The double or balanced pipes $h\ h$, the air or valve-chamber B communicating therewith, the valve or gate $n$, screw $n'$, the strips $i\ i$ and $i'\ i'$, the scrapers $p\ p\ p$, the scrapers $r\ r$, and the several discharge-ports $c\ c\ c$, all arranged substantially as described.

10. The bed $s$ of pan $s'$, the eccentric $v$, eccentric-rod $y$, and the stirrer $t$, as and for the purpose specified.

Witnesses:            THOS. J. CHUBB.
  BALTIS DE LONG,
  E. C. DAVIDSON.